Sept. 12, 1967      R. W. LOHEED ET AL      3,341,104
CORRUGATED FIBER BOARD CONTAINER FOR LIQUIDS
Filed April 20, 1965      7 Sheets-Sheet 1
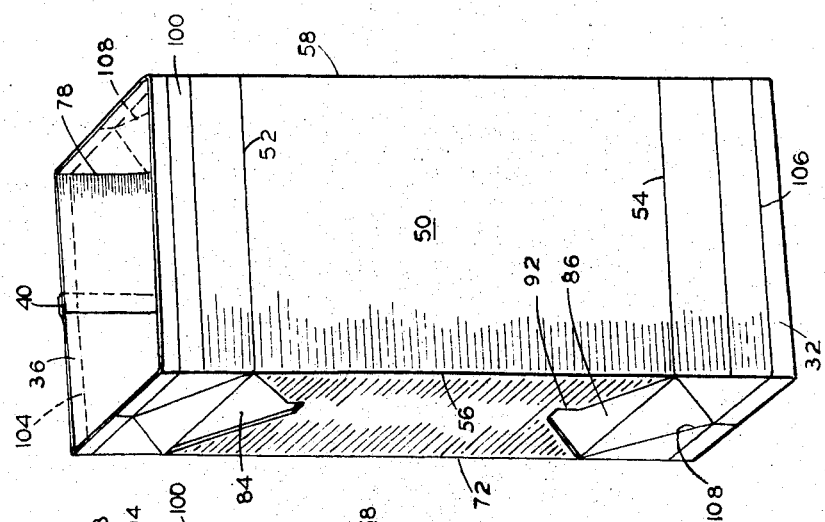
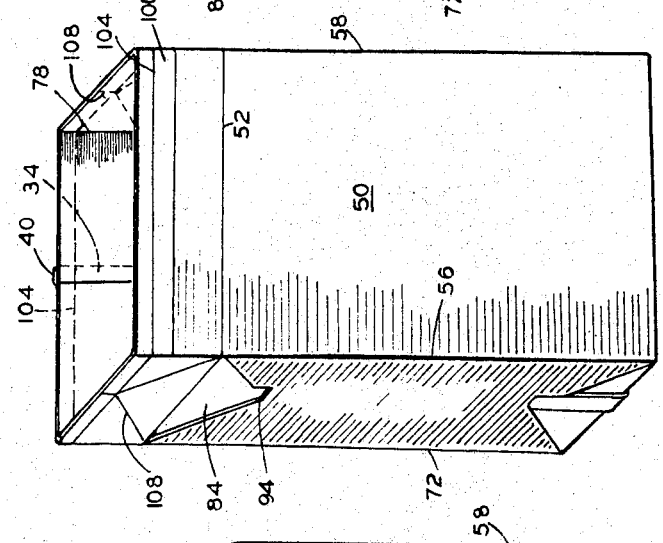
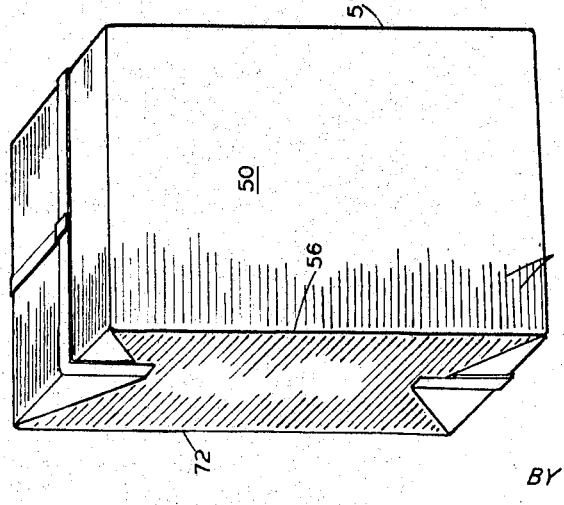
INVENTORS.
RICHARD W. LOHEED.
RALPH ZYNDA.
THOMAS J. KOEHLER.
GORDON W. WHITAKER.
JAMES W. MOLLISON.
BY
ATTORNEY

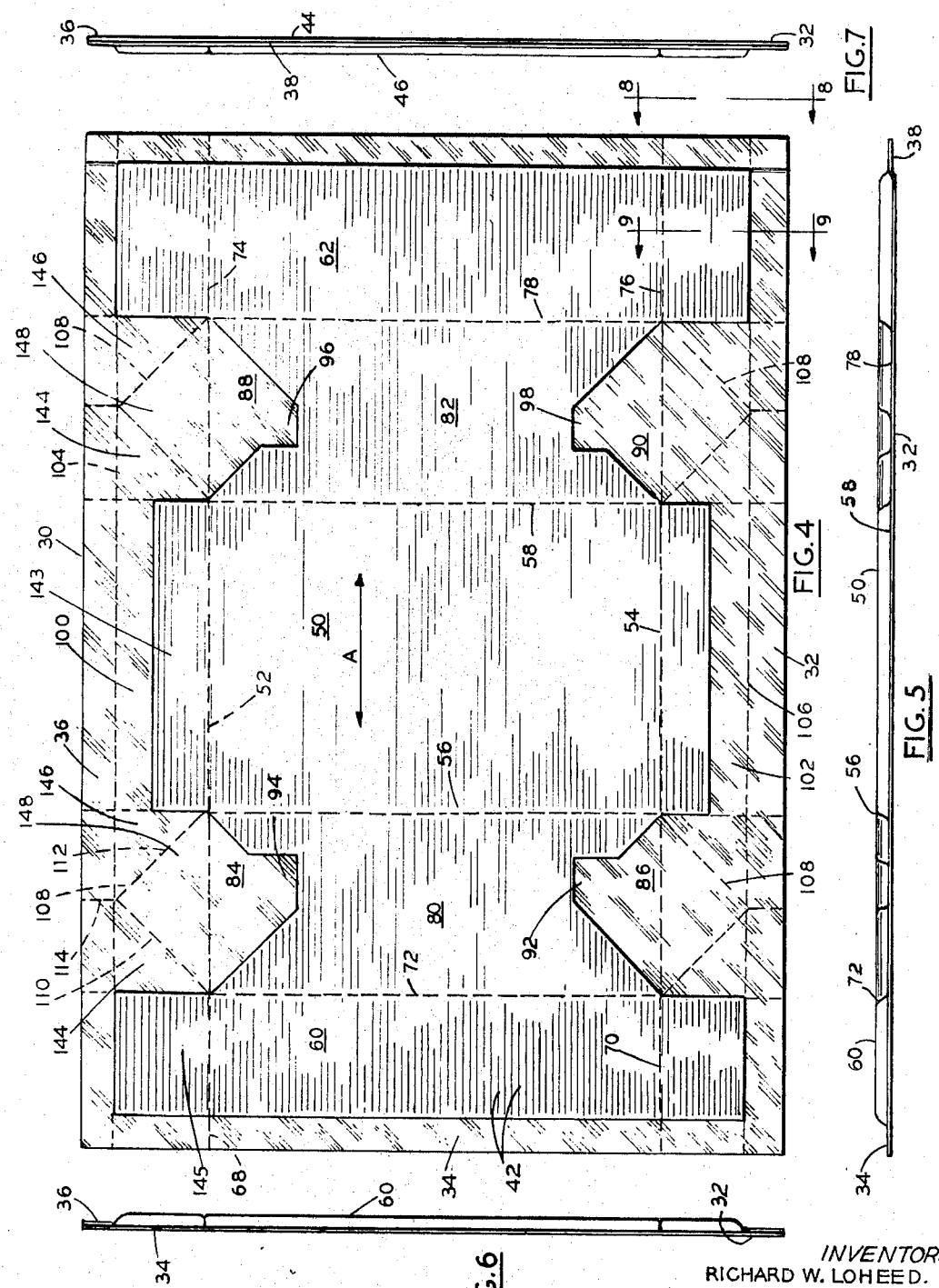

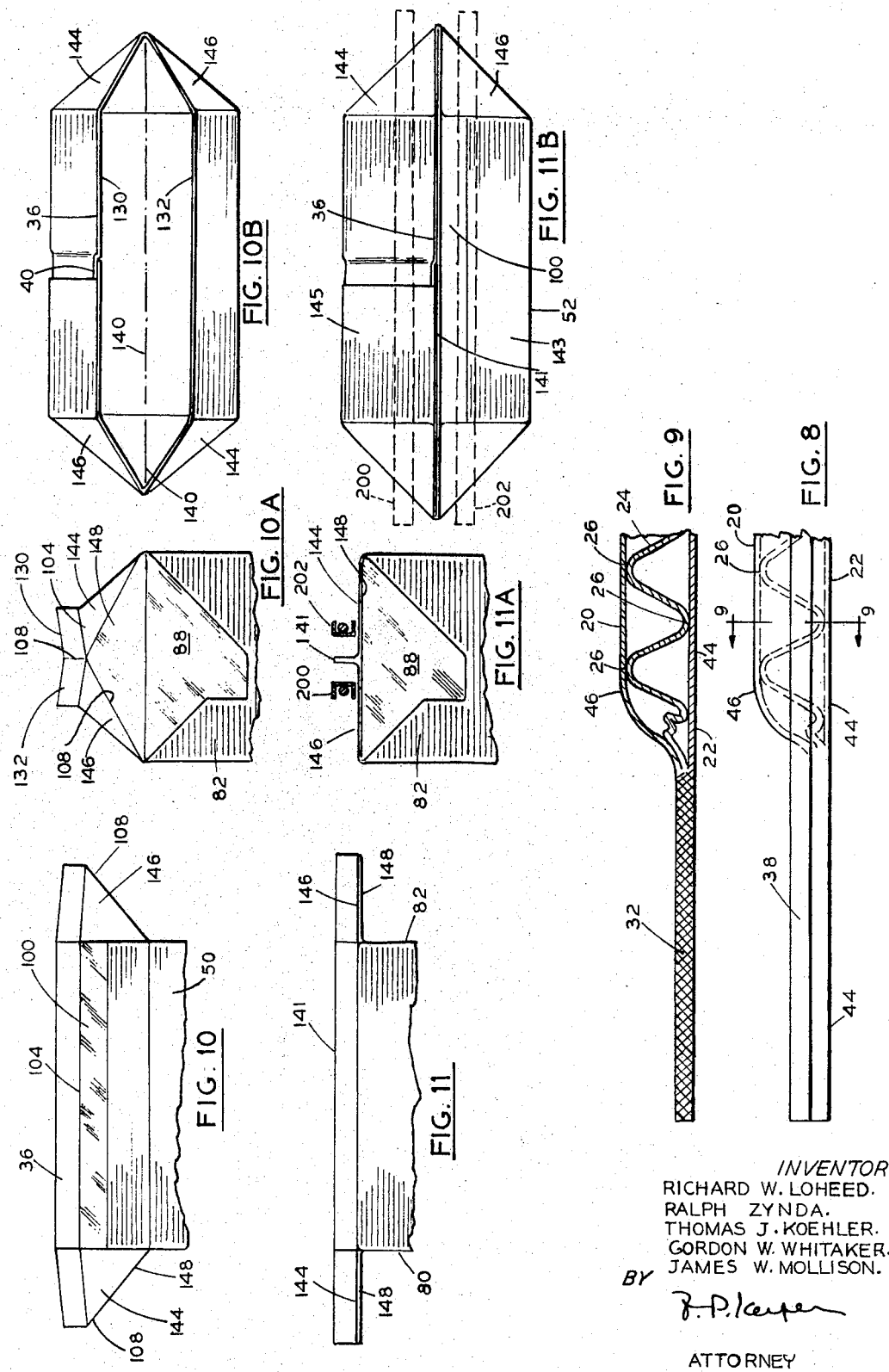

Sept. 12, 1967 R. W. LOHEED ET AL 3,341,104
CORRUGATED FIBER BOARD CONTAINER FOR LIQUIDS
Filed April 20, 1965 7 Sheets-Sheet 4
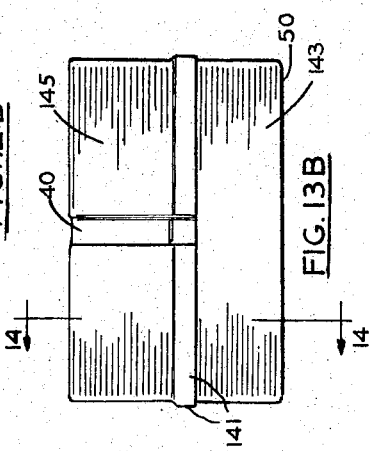
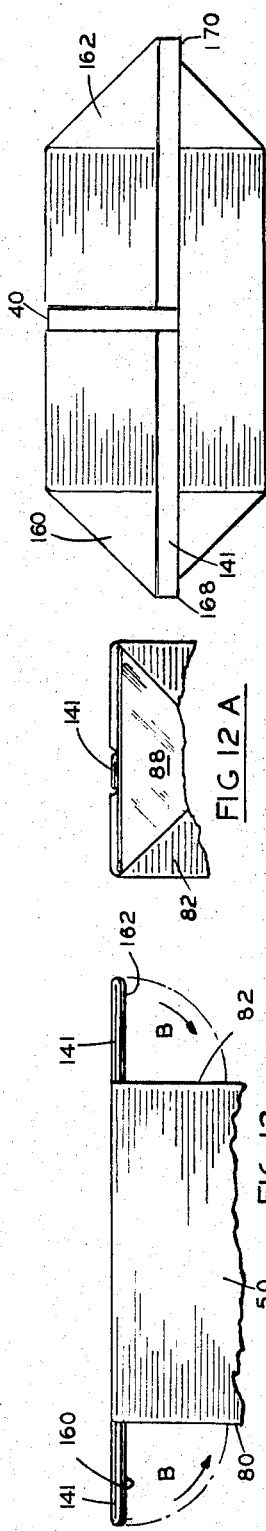
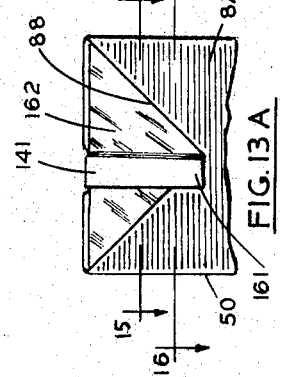
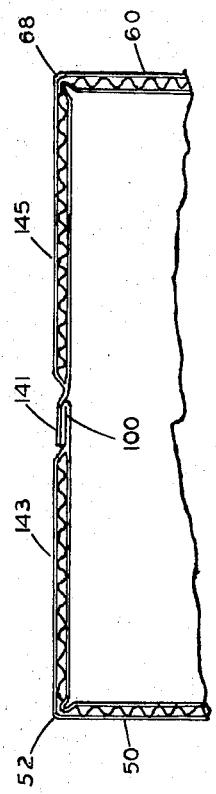
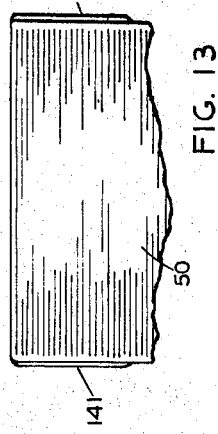
INVENTORS.
RICHARD W. LOHEED.
RALPH ZYNDA.
THOMAS J. KOEHLER.
GORDON W. WHITAKER.
JAMES W. MOLLISON.
BY J. P. Leeper
ATTORNEY

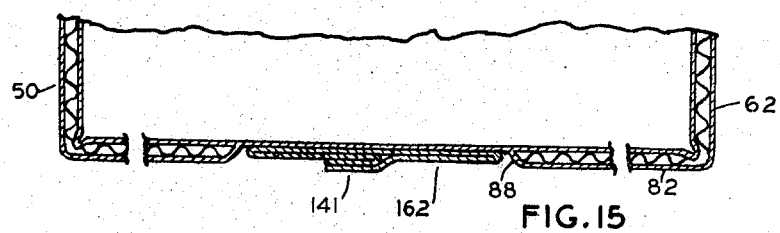
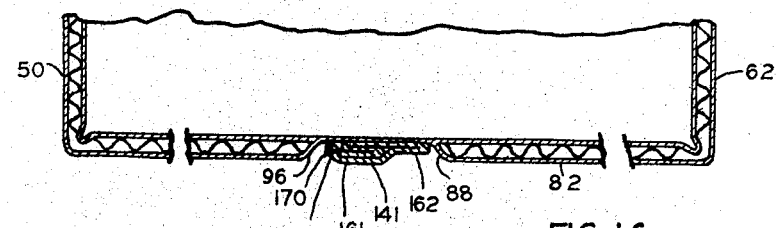
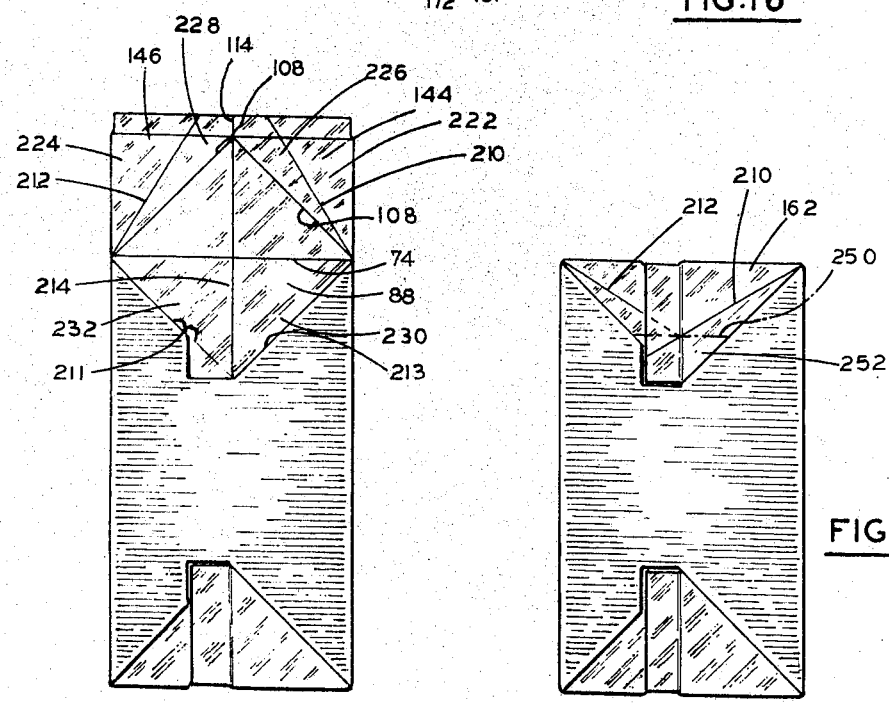

Sept. 12, 1967   R. W. LOHEED ET AL   3,341,104
CORRUGATED FIBER BOARD CONTAINER FOR LIQUIDS
Filed April 20, 1965   7 Sheets-Sheet 6

*INVENTORS,*
RICHARD W. LOHEED.
RALPH ZYNDA.
THOMAS J. KOEHLER.
GORDON W. WHITAKER.
JAMES W. MOLLISON.

BY

ATTORNEY

Sept. 12, 1967   R. W. LOHEED ET AL   3,341,104
CORRUGATED FIBER BOARD CONTAINER FOR LIQUIDS
Filed April 20, 1965   7 Sheets-Sheet 7

INVENTORS.
RICHARD W. LOHEED.
RALPH ZYNDA.
THOMAS J. KOEHLER.
GORDON W. WHITAKER.
JAMES W. MOLLISON.

BY

ATTORNEY

3,341,104
CORRUGATED FIBER BOARD CONTAINER FOR LIQUIDS
Richard W. Loheed and Gordon W. Whitaker, West Lafayette, Thomas J. Koehler and James W. Mollison, Lafayette, and Ralph Zynda, Battle Ground, Ind., assignors to Inland Container Corporation, Indianapolis, Ind., a corporation of Indiana
Filed Apr. 20, 1965, Ser. No. 449,597
15 Claims. (Cl. 229—37)

This invention relates to one-piece corrugated fiber board containers for packaging or containing liquids.

Corrugated fiber board, as used in containers comprises an intermediate corrugated layer and outer liners adhesively united together, the three layers being usually formed of kraft paper of suitable weight and thickness. Cartons formed of ordinary corrugated fiber board are not adapted for use in connection with liquids, slurries, or hygroscopic materials, since the fibrous nature of the paper from which the corrugated board is formed and the nature of the corrugated construction are subject to substantial deterioration if not total destruction, when subjected to moisture. In order to utilize the recognized high mechanical strength of corrugated fiber board, it has been necessary to maintain the fiber of the liners and corrugating medium dry, and the fluted construction intact.

Various proposals have been made for the use of corrugated fiber board containers in the packaging and transport of liquids by employing impervious liners in the form of thin sheet plastic bags and the like within the corrugated board containers. The liners contain the liquids and prevent the liquids from contact with the supporting corrugated fiber board carton. However, such liners are an item of considerable cost, require additional handling in use and add nothing to the strength of the overall package.

While one or both of the exterior surfaces of corrugated fiber board may be impregnated or coated with liquid proofing materials, such surface treatment does not render corrugated fiber board capable of use as a liquid container, because of the open flutes and unprotected edges.

The present invention is directed to the preparation of corrugated fiber board so as to render it useful in the formation of one-piece containers for liquids or other structures. The invention is directed to the concept of crushing the edge portion or portions of a blank of corrugated fiber board reinforced with adhesives and fortifying agents, to convert the edge portion to solid fiber board and thereby seal the edges. Further the invention is directed to the crushing of the edge portions of a corrugated fiber board carton blank under heat, or such conditions as to render the edge portion or portions a solid mass of homogenously entangled fibers and capable of sustained exposure to liquids without absorption of the same to provide edge portions that are permanently transformed into solid board. The invention contemplates the utilization of sufficient adhesive applied to the surfaces of the corrugating medium, at least in the areas to be converted to solid board as to provide the necessary bond between the crushed layers, whereby once crushed, the edge portions become the equivalent of solid fiber board which seal the edges of the blank, and prevent entry of moisture into the flutes of the uncrushed areas of the blank.

The invention further has to do with crushing various areas of a blank as well as the marginal portions so as to provide a solid fiber board more readily capable of resilient forming, or bending as on score lines, by reason of the elimination of the relatively thick corrugated fiber board structure in such areas, and the relative thinness of the solid fiber board in such areas. It will thus be seen that with moisture proofing of the surface or surfaces of such a blank in combination with the sealing of the edges resulting from the formation of solid board, a blank is provided that is impervious to moisture and capable of being employed to form one-piece liquid-tight container or other structures.

The invention further has to do with the utilization of the crushed areas in connection with carton end closure structure such that multiple thickness and folds of the crushed material may nest in crushed areas so that the total thicknesses do not materially exceed the overall thickness of the corrugated fiber board uncrushed areas. The invention further has to do with a "hybrid" corrugated fiber board carton having portions crushed and converted to solid board and capable of shipment in the usual flat form, and capable of erection, filling, utilizing standard liquid filling apparatus, and capable of being sealed, at the filling station. Additionally the invention has to do with various sealing methods, as well as means for subsequently conveniently dispensing the liquid contents from the sealed package.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

FIGURE 1 is a perspective view of the box with both ends closed and sealed;

FIGURE 2 is a perspective view of the box with its upper end open;

FIGURE 3 is a perspective view of the box with both ends open;

FIGURE 4 is an exterior plan view of the box blank of FIGURES 1, 2 and 3;

FIGURE 5 is a side edge view of the blank;

FIGURE 6 is a left hand end edge view of the blank of FIGURE 4;

FIGURE 7 is a right hand end edge view of the blank of FIGURE 4;

FIGURE 8 is a greatly enlarged fragmentary view of the lower portion of the right hand end edge;

FIGURE 9 is a greatly enlarged fragmentary sectional view taken on the line 9—9 of FIGURE 4;

FIGURES 10, 10A and 10B are side, end and top views respectively, of the upper portion of a box partly formed for closure;

FIGURES 11, 11A and 11B are side, end and top views respectively of the upper portion of a box ready for sealing;

FIGURES 12, 12A and 12B are side, end and top views respectively of a box after nesting the seal in the top complemental depression;

FIGURES 13, 13A and 13B are side, end and top views respectively of a box after nesting the triangular flaps in the complemental box end wall depressions;

FIGURE 14 is a fragmentary enlarged sectional view taken on the line 14—14 of FIGURE 13B;

FIGURE 15 is a fragmentary enlarged sectional view taken on the line 15—15 of FIGURE 13A;

FIGURE 16 is a fragmentary enlarged sectional view taken on the line 16—16 of FIGURE 13A;

FIGURE 17 is an end view of a modified carton with the upper end open, and scored to form a dispensing pour spout;

FIGURE 18 is an end view of the modified carton with its upper end closed;

Figure 19:
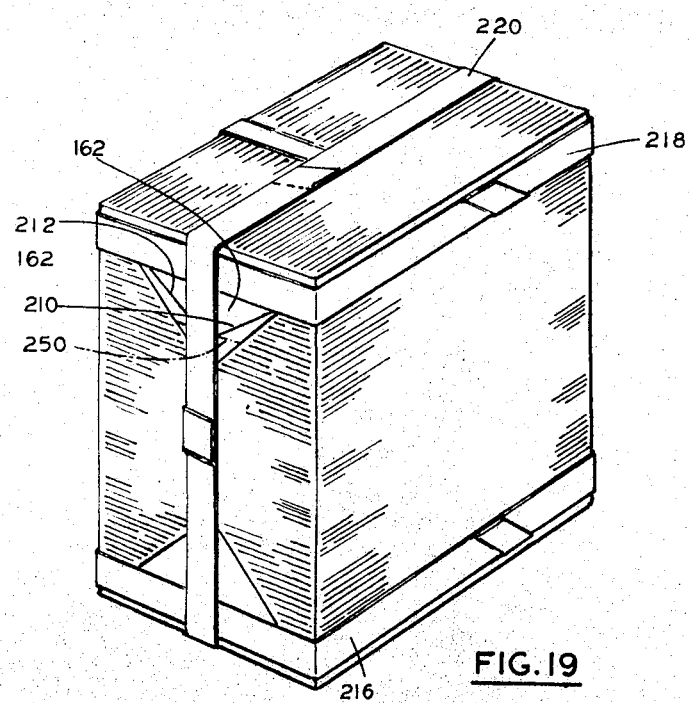
FIGURE 19 is a perspective view of the modified pour spout carton with tape banding.

Referring to FIGURE 1, there is shown a box constructed of corrugated fiber board, such as is generally employed for corrugated fiber board cartons. Such corrugated board comprises spaced exterior liners 20 and 22 of heavy paper such as kraft, with an intervening fluted or corrugated layer 24 of similar heavy paper of approximately the same weight if desired, the corrugated board in being formed having the loops of the corrugations of the corrugated medium adhesively or otherwise bonded to the inner surfaces of the liners as at 26 (see FIGURE 9) whereby to provide the usual relatively rigid truss structure inherent in corrugated fiber board. While adhesive, as a bonding agent, has been referred to, such agent would preferably be a hot melt adhesive, such as a thermoplastic formulation or other equivalent bonding agent. In the manufacture of the board for use in the present invention, the bonding agent will be applied to the surfaces at the points of contact of the corrugated loops, but also over areas, limited or otherwise, adjacent thereto, for reasons which will hereinafter appear.

As has been previously referred to, the usual rectangular box formed of corrugated fiber board is erected from a blank provided with suitable end flaps defined by scoring and slots, the body portion of the blank being folded into opposite like rectangular panels, on score lines aligned with the flap forming slots. Such usual construction includes a manufacturer's joint comprising overlapped side edges of the corrugated fiber board blank to complete the blank which may thereafter be erected into a rectangular sectioned tube. In order to utilize the strength characteristics of corrugated fiber board, and to provide a box which may be sealed to retain liquids, without a liner, the present invention contemplates the uses of an impervious rectangular blank of corrugated fiber board, free of slits, and wherein the perimetral edge has been sealed by crushing the fiber board under heavy pressure, into a thin homogenous section corresponding to solid fiber board. Such sealing may be effected while subjected to heat or steam, while under heavy pressure, or pressure applied immediately thereafter, whereby the adhesive, or bonding agent used to bond the liners with the corrugated medium will spread out between the liners and corrugated medium during the crushing process, to provide a solid board of intertwining and intermingled fibers from all three layers, the layers losing to a substantial degree their identity as such by the crushing and bonding operation. In this manner, the edges of the blank are sealed against moisture entering the ends of the corrugated flutes, or the side edges along the flutes. Sufficient adhesive may be used in the original manufacture of the board so that the corrugated board, when crushed under heat and pressure will result in a homogenous mass corresponding to solid fiber board. In practice the opposed surfaces of the corrugating medium may be coated with sufficient adhesive to provide the necessary bond between the crushed layers and fibers thereof.

As shown in FIGURE 5, the blank 30 is crushed and bonded along its left hand, top, bottom and end edges to convert the same to solid fiber board as is indicated at 32, 34 and 36 respectively, and the opposite right hand edge is also crushed and bonded as at 38, the crushed end edge being preferably offset by the thickness of the solid board (see FIGURES 5 and 8), so that such edge portion 38, may together with the edge portion 34, be formed into a manufacturer's joint 40, providing a relatively smooth interior surface, when the box blank is folded to form a rectangular sectioned tube. It will be seen that such joint will be of substantially less thickness than that of the corrugated board adjacent thereto.

In employing a sealed edge blank to form a liquid-tight container, the corrugations or flutes of the corrugated fiber board may preferably extend in the direction of the double arrow A, and such corrugations are indicated by uniformly spaced horizontal light shade lines 42 on the exterior of the box, as for example in FIGURE 1, such corrugated board often showing on its exterior, evidence of the flute direction and pitch by faint lines. Referring to FIGURE 8, the surface 44 will become the inner surface of the box when formed, and the surface 46 will be the outer surface. Thus the blank, as shown in FIGURE 4, appears with the outside face 46 facing up.

The blank of FIGURE 4 has a large rectangular body side panel 50 defined by score lines 52, 54, 56 and 58, and the opposite side panel of the box, when formed into a rectangular sectioned tube, is composed of two rectangular panels 60 and 62 defined by score lines 68, 70, 72, and 74, 76 and 78 respectively, and such panels 60 and 62 are adapted to be joined by overlapping the solid board end edge portions 34 and 38 to form the joint 40. The blank has end panels 80 and 82 disposed between the side panel 50, and panels 60 and 62.

In addition to the crushed and bonded marginal edge portions 32, 34, 36 and 38 heretofore referred to, additional areas of the blank contiguous to the edge portions are likewise crushed to convert the corrugated board to relatively thin solid board. The upper and lower ends of each of the side panels 80 and 82 have triangular crushed areas 84 and 86, and 88 and 90 respectively, and such crushed areas extend along the score lines 72 and 56 and the score lines 58 and 78 respectively, to the upper and lower crushed edge areas 32 and 36 respectively. Additional small triangular bays as at 92, 94, 96 and 98 may be crushed and bonded to solid board, for reasons which will appear hereinafter. In addition the top and bottom areas 100 and 102 are crushed to solid board. All the areas so crushed are indicated by light angular surface shading to indicate the smooth surface of the solid board, while the uncrushed areas are surface shaded horizontally as previously described to indicate the flute direction and pitch.

The score lines 56, 58, 72 and 78 extend from the upper to the lower edge of the blank. Score lines 104 and 106 extend from one side to the other of the blank, as do the score lines 68, 52 and 74, and 70, 54 and 76, such score lines extending through uncrushed and crushed areas. Additional Y shaped scoring 108 comprising diagonal score lines 110, 112, and a short score line 114 extending across the edge portions 32 and 36 are also provided.

Preferably the blank is coated on both sides with a hot melt adhesive coating, to render both surfaces in their entirety impervious to liquids. The blank may then be folded to form a rectangular sectioned tube, as shown in FIGURE 3, and the manufacturer's joint 40 affected by heat sealing the overlapped ends 34 and 48, the hot melt adhesive coating applied to the opposite sides of the blank being sufficient to form the joint, when the overlapped ends are subjected to heat and pressure. It will be appreciated that the overlapped ends 34 and 38, having been converted to solid board by crushing and bonding of the layers into a substantially homogenous mass, permits the employment of an adhesively prepared joint, since the solid board ends, in their crushed and bonded state, are in effect solid board with adequate internal strength incapable of separation. It will further appear that the joint so formed becomes in effect a section of solid fiber board of double the thickness of the two overlapped components. The fact that the crushed and bonded areas referred to are reduced to a solid fiber board state, will be seen as instrumental in the formation of liquid containers whose main body portions comprise relatively rigid corrugated fiber board areas, whereas the end closures comprise solid fiber board areas of the substantially thinner section. The bonding of the crushed layers in the solid fiber board areas together with the surface coating of hot melt adhesive permits overlapped portions of such solid board to be bonded together by the application of heat and pressure, such that any two or more superimposed areas of such solid fiber board areas become in effect a single solid fiber board section of thickness corresponding to the number of superimposed layers bonded together.

When the tubular box blank with its joint 40 completed, is erected as in FIGURE 3, one end is closed and sealed, to form a box having one end open as in FIGURE 2. The box may then be filled with liquid by any suitable filling apparatus, preferably employing a submerged nozzle to avoid splash. Thereafter, the open end is also sealed to provide the completed sealed box of FIGURE 1. Since both ends of the rectangular tubular box blank may be sealed in substantially the same manner, it will suffice to describe the sealing operation once, and for this purpose reference to FIGURES 10-13A and B will be had, the reference characters being applied to indicate the upper end of the box as shown in FIGURE 2. Referring to FIGURES 10, 10A and 10B, the upper opposite portions 130 and 132, of the upper crushed edge portion 36 defined by the score line 104, are moved toward the center line or center plane 140 of the box (see FIGURE 10B) and brought into contact as shown in FIGURE 11B to form a fin, flange or flattened cuff. It will be seen, that in so doing, the triangular portions 144 and 146 will, together with the triangular area 148 protrude outwardly from either side in the form of triangular wings, as folding along the Y score lines 108 takes place.

The cuff, when brought together and flattened to form an upstanding elongate fin 141, will be disposed midway between the rectangular area 143 defined by the score lines 52, 56, 104 and 58, and the rectangular area 145 having the joint 40, defined by the score lines 68 and 74, 72, 104 and 78. The areas 143 and 145 will lie in a common plane to form the upper end of the box. The fin or flattened cuff may then be squeezed together under heat and pressure, as by bringing together opposed heating and pressure bars 200 and 202. Sufficient heat is applied to the cuff to fuse the hot melt adhesive plastic coating material between the facing surfaces of the cuff, whereby the cuff is bonded into a solid fin, the fin 141 being continuous, and of a thickness double the thickness of the solid board of the cuff except as at the manufacturer's joint 40, where three thicknesses may be evident. While the formation of the fin results in a seal across the end of the box, it may be desirable to apply pressure and heat between the triangular areas 144 and 146 and the triangular area 148, whereby to bond the sections together and reduce the triangular wings 160 and 162 to solid board of double the thickness of the areas 144, 146 or 148.

Thereafter, as shown in FIGURES 12, 12A and 12B, the fin 141 is formed over so as to lie against the crushed area 100, which area is of a width ample to receive the fin. In practice the crushed solid board may have a thickness in the order of one-fourth of that of the uncrushed corrugated board, although by employing different flute pitches and amplitudes of the corrugated medium, and by varying the thicknesses of the kraft liners and medium, the ratio between the thickness of the uncrushed corrugated board, and the solid board may be varied to meet requirements.

Assuming the thickness of the solid board to be one-fourth that of the corrugated board, it will be seen that when the fin is formed flat to lie in the recess area 100, the total thickness of the carton in that area is ¾ of the thickness of the adjacent corrugated board, and hence such fin may lie flush or below the box end surface.

To complete the closure operation, the triangular end ears or wings 160 and 162, see FIGURE 12, are formed downwardly along the box end walls 80 and 82 in the direction of the curved arrows B, and the ears nested in the triangular recesses 84 and 88 as in FIGURES 13 and 13A. The fin 141, with its squared ends 16 are adapted to nest in the triangular bay areas 94 and 96.

It will be seen that the triangular ears, 160 and 162, except for the thickness of the fin 141 and double the thickness of the solid board and thus nest neatly within the recesses 84 and 88, and except for the fin, may be disposed entirely inwardly of the plane of the outer surfaces of the corrugated end walls 80 and 82. On the other hand, the fin, being double the thickness of the solid board will result in a total thickness approximately five times the thickness of the solid board, and thus may partially lie without the plane of the end walls 80 and 82. However, the corners 168 and 170 of the fin 141 extend beyond the apices of the wings 160 and 162, and may recess within the bays 94 and 96, below the corrugated surface areas of the walls 80 and 82, such corners 168 and 170 being readily deformed or offset as at 172 for this purpose. Thus the corners of the fin are not exposed outside of the plane of the outside surfaces of the end walls 80 and 82, and if adhesively secured within the recesses 84 and 88, will serve to retain the wing apices nested.

The ears when formed over to lie in the side wall triangular recesses may be secured by pressure adhesive to the respective recess walls, and pressure may be applied to the exterior of the ears during the setting of the adhesive, by utilizing the liquid contents of the box as an hydraulic mandrel, the box being held in a form during such operation, the form being suitably constructed to prevent strain or bulging. It will be understood that the above operation utilizing an hydraulic mandrel would only be required for closing the second end of the box, since any suitable form may be inserted into the box to assist in pressure sealing, or heat sealing if desired, of the ears in initially completing the closure of one end of the box. On the other hand after the ears of the lower end have been seated within the recesses, such ears may be temporarily held during the filling, and closing of the upper end, after which all ears may be adhesively secured within their respective recesses by a pressure sealant, by application of exterior pressure while utilizing the liquid contents as an hydraulic mandrel.

Figure 21:
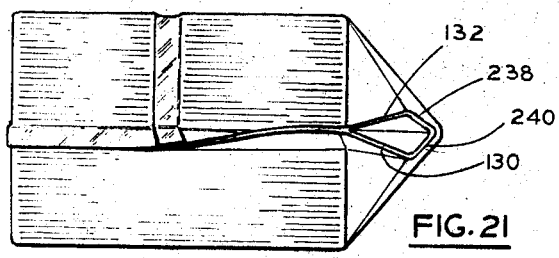
FIGURE 21 is a top plan view of the modified carton with its pour spout opened.
Figure 20:
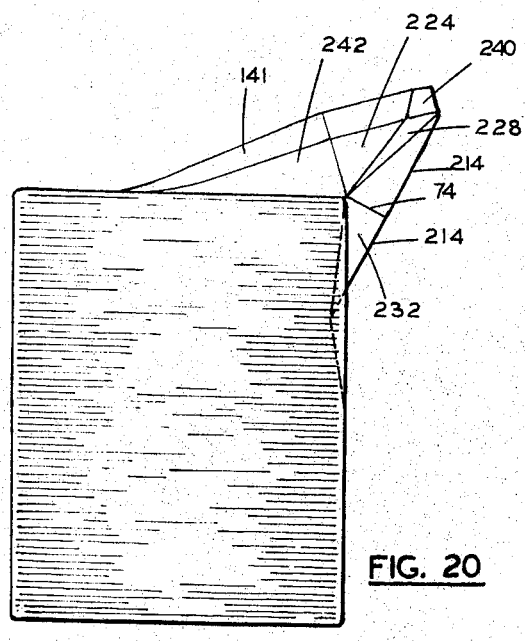
FIGURE 20 is a side view of the modified carton with its pour spout extended.
Figure 23:
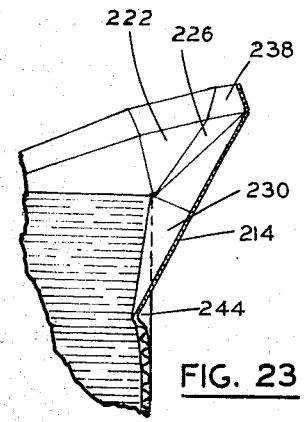
FIGURE 23 is a fragmentary sectional view taken on the line 23—23 of FIGURE 22.

For convenience, it may be desirable to provide for emptying the container from a pour spout developed from one of the ears 160 or 162. For this purpose reference will be had to FIGURES 17-23. In FIGURE 17, an end view of one side of the upper end of the container, prior to closure of the top is shown. To provide for future manipulation of such upper end at one side of the container into a pour spout, after the upper end has been closed, additional score lines 210, 212 are provided, and the score line 114 extended as at 214 to the lower end of the crushed area 88. Such score lines may be applied when the box is in blank form as in FIGURE 4, to any one of the crushed end closure areas which is to serve as a pour spout. The open end of the container, after filling, is closed at its other end in the same manner as described in conjunction with FIGURES 10-13. However, at the pour spout end, the bond between the opposite portion of the cuff will be preferably lightly formed, to permit separation as is indicated at 238 and 240, in FIGURE 21. Furthermore, the bonding of the triangular areas 144 and 146 to the triangular area 148 heretofore described will be omitted, and the pour spout wing with its additional scorings 210, 212, 214 and scored along lines 211 and 213 will be held nested in its recess 88, by releasable means such as removable sections of adhesive tape 218 and 220.

It will be seen in FIGURE 17, that the additional scorings result in right triangular areas 222 and 224, scalene triangular areas 226 and 228 and triangular areas 230 and 232. When it is desired to form a pour spout to dispense the liquid content from the container, a portion 234 of the adhesive tape 220 and an end portion 236 of the adhesive tape 218 may be removed, so that the wing 162 may be swung from its nested position, as shown in FIGURES 18 and 19, to a horizontally outwardly extending position in respect to the upper end of the container. Thereafter, the sealed fin at the pour spout end will be lifted to a vertical position, and the lightly sealed adhesion between the portions 130 and 132 of the fin 141 will permit the spreading apart of the cuff to form the lips 238 and 240 of a pour spout. The end portions of the container cover will be lifted somewhat as is indicated at 242 in FIGURE 20. At the same time the triangular areas 230 and 232 will be bent from their common plane, on the score line 214, deforming the upper portion of the end wall of the container slightly as at 244. At the same time the triangular area 148 is bent on the score line 214, and cooperates with the scalene triangular areas 226 and 228, and the triangular areas 222 and 224, to form the lower portion of the spout leading to the parted lips at 238 and 240.

It will be seen that the pour spout as thus derived, requires no cutting, of the container material. Only parting of the fin portions 132 and 130, which were lightly heat sealed together need be effected.

Figure 24:
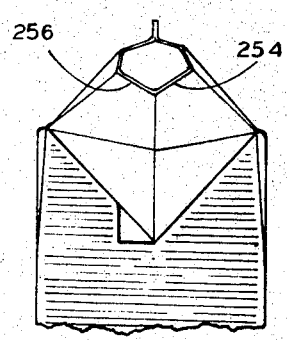
FIGURE 24 is a fragmentary end elevational view of a pour spout formed by cutting away a section of a wing flap.
Figure 25:
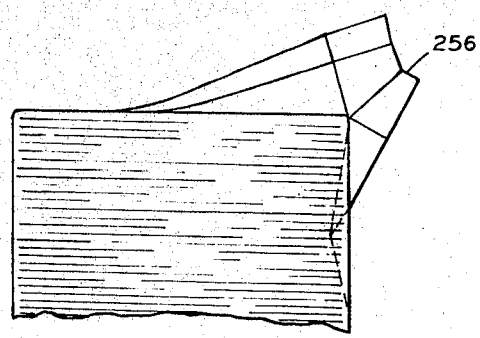
FIGURE 25 is a fragmentary side elevational view of the pour spout of FIGURE 24.

If desired, an equally effective pour spout may be formed, by cutting and removing a section of the wing 162, after lifting the same from its nesting position in the container end wall. For this purpose a cutting line 250 may be imprinted upon the ear as is shown in FIGURE 8. When the wing 162 is swung out from the container end wall, the wing is cut along the line 250, and the apex 252 of the wing removed and discarded. Thereafter, without the necessity of opening the seal closing the fin 141, a pour spout having lips 254 and 256, as shown in FIGURES 24 and 25 may be formed.

Figure 26:
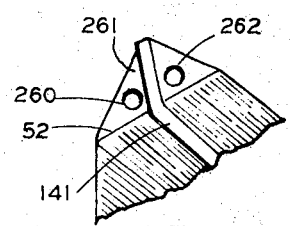
FIGURE 26 is a fragmentary perspective view illustrating the manner of utilizing one wing flap as a corner handle.

If desired, as indicated in FIGURE 26, a wing 261 opposite from the pour spout end, may be provided with finger apertures 260, 262 so that after removal of the banding tape 218 (see FIGURE 19) the wing may be hinged from its recess in the carton side wall, in the manner shown in FIGURE 26, to serve as an integral handle, by which the carton can be carried or supported, while tilting the carton for pouring from a spout at the other side. In such case, the triangular layers are bonded together to the score line 52 by application of heat and pressure to fuse the hot melt adhesive coating applied to the facing surfaces.

Figure 28:
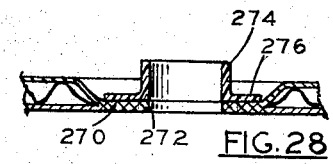
FIGURE 28 is an enlarged sectional view taken on the line 28 of FIGURE 27.
Figure 27:
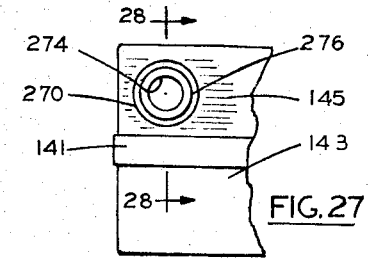
FIGURE 27 is a fragmentary top plan view of a box having one flap provided with a pour spout.
Figure 22:
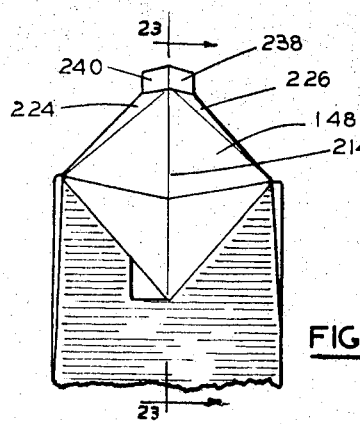
FIGURE 22 is a fragmentary end elevational view of the pour spout.

By extending the basic principle of the invention further, one of the flaps may be provided with an aperture, adjacent a corner of the carton, by crushing and bonding the corrugated material into solid board in an annular area surrounding the aperture, as indicated in FIGURES 27 and 28. On the other hand, a circular area 270 may first be crushed and bonded, and thereafter a circular or other shaped aperture 272 punched through the central portion of the crushed solid fiber board area. A flanged circular pour spout 274, which may be capped in any suitable manner, if of thermoplastic material may have its flange 276 heat sealed to the hot melt adhesively coated crushed solid board annulus 270. The cut edge of the aperture 272, being cut through fused and bonded solid board, will be sealed and protected from penetration of the liquid within the container. The attachment of the flange to the flap may be effected after formation of the blank into a box and if desired, the flange 276 of the spout may be attached to the inside surface of the crushed annulus (not shown) so that the spout, if relatively short, may not project unduly beyond the top surfaces of the carton, when the carton is closed and sealed.

It will be seen from the foregoing that the concept of crushing and bonding the layers of corrugated board into solid board to seal an edge, or the entire perimetral edge, may be utilized in various ways in the construction of a liquid-tight carton from corrugated fiber board. While a liquid-tight box has been selected to illustrate the utility thereof, the concept may be used in conjunction with corrugated fiber board in applications other than boxes for liquids, to preserve the strength characteristics of corrugated board, by keeping the fibrous structure dry even though exposed to dampness.

Thus the concept of sealed edges formed by conversion from corrugated board to solid board renders such corrugated board capable of use in many fields heretofore not considered open to corrugated board.

In practice, it will be understood that the corrugated board may be manufactured with a sufficient coating of hot melt adhesive upon the facing surfaces of the liners and corrugating medium, or the corrugated medium alone, whereby crushing under heat and pressure in any selected area will effect conversion to solid board in that area. On the other hand, corrugated board, manufactured with sufficient adhesive to merely join the contacting surfaces, and insufficient for conversion to solid board by heat and pressure, may have its cut edges supplied with additional hot melt adhesive by injection into the cut edges in a sufficient amount, whereby upon crushing under heat, all of the contacting layers of the liners, and corrugations will be adequately coated so that bonding and conversion to solid board is effected.

It has been the practice, in the usual slitted flap type of corrugated board container, to provide a manufacturer's joint by overlapping portions of corrugated fiber board and joining the overlapped areas by stitching or stapling, which fastening means extend through the entire thicknesses of the overlapped corrugated board. Such practice increases the thickness of the folded blank, such that blanks thusly completed require more shipping space by reason of the treble thickness at the joint. It has generally been considered impractical to adhesively secure such overlapped fiber board areas by mere adhesive means, since the adhesive joins the two adjacent paper liners only, which may readily pull apart from their respective corrugated medium and the other liner. Thus by merely effecting conversion of the corrugated board to solid fiber board in the areas to be overlapped for the joint, adhesives may be used to form the joint, since the solid fiber board has been so solidified by the crushing and bonding of the liners and medium, as to convert the fibrous stock thereof into a single inseparable mass, the evidence of any laminar construction having been substantially eliminated by the bonding and crushing into solid fiber board. Thus a manufacturer's joint comprised of adhesively joined crushed and bonded areas of solid board, results in a folded box blank of only double the thickness of the corrugated board.

In practice the corrugated board to be used in the "hybrid" construction contemplated herein, where portions are densified and reduced to solid fiber board, may during manufacture, have the entire surface area of the corrugating medium coated with adhesive prior to applying the liners thereto, and effecting the juncture of the liner with the flute ridges or nodes. On the other hand, only the flute ridges may be coated with adhesive, generally, while surface areas of the medium that are to be ultimately subjected to conversion to solid board will be coated continuously in those areas. Such selective application of adhesive to the corrugated medium during manufacture of the corrugated board will evidence savings in the amount of adhesive employed.

It will be understood that heretofore corrugated fiber board has generally been recognized as a structurally sound material for applications where not subjected to moisture. Thus by providing a sealed perimetral crushed and bonded edge around a section of such board, that has not otherwise been altered or disturbed, a sheet of material having the structural strength of corrugated fiber board results, that can be employed in locations where dampness exists, without danger of the destruction of the material or loss of strength due to liquid penetration. The surface coating of such a sheet of material so as to render a surface or both surfaces impervious to liquids and moisture, plus the sealed edges which resist or prevent penetration of moisture from the edges, operates to maintain the interior fluted structure dry, and maintains the corrugated fiber board at its full mechanical strength.

While the invention has been illustrated and described in conjunction with a liquid-tight box, and features thereof, it is to be understood that the invention is not limited thereto. As various uses and changes in the construction and arrangements may be made without departing from the spirit of the invention, as will be apparent to those skilled in the art, reference will be had to the appended claims for a definition of the limits of the invention.

What is claimed is:

1. Corrugated fiber board consisting of two spaced paper liners and an intervening corrugated paper medium, having the loops thereof bonded to said liners, said paper medium having adhesive applied to its entire surface, said fiber board having a crushed area of solid board wherein the liners and medium are bonded by said adhesive into a solid mass of substantially inseparable fibers of a thickness less than half the thickness of the uncrushed fiber board area, said solid board having parallel surfaces and being more readily capable of forming and bending on score lines than the uncrushed areas.

2. Corrugated fiber board consisting of two spaced paper liners and an intervening corrugated paper medium, having the loops thereof bonded to said liners, said paper medium having adhesive applied to both of its surfaces over corresponding portions on opposite sides, said fiber board having a crushed area of solid board wholly within said adhesive applied portions and wherein the liners and medium are bonded by said adhesive into a solid mass of substantially inseparable fibers of a thickness less than half the thickness of the uncrushed fiber board area and having parallel surfaces, and at least one of said liners having a coating of moisture proofing material; said solid board area being more readily capable of forming and bending on score lines than the uncrushed areas.

3. A substantially rectangular section of corrugated fiber board consisting of two spaced paper liners having moisture resistant outer surfaces and a corrugated paper medium disposed therebetween and with the loops of said medium bonded to the inner surfaces of said liners, said paper medium having adhesive applied to its surfaces adjacent to the edges of said section, said rectangular section having all of its edge areas crushed to solid board having parallel surfaces with the liners and medium adjacent the edges bonded by said adhesive into a solid mass of substantially inseparable paper fibers, whereby to seal all of the edges of said section against moisture penetration and to seal a central uncrushed area of said section continuously around its perimeter against moisture penetration and to provide a surrounding solid board portion more readily capable of forming and bending on score lines than the central uncrushed area.

4. A corrugated fiber board container blank formed of a rectangular unslotted section of fiber board having liners and a corrugating medium, said blank having a crushed uninterrupted continuous perimetral marginal edge in which the liners and corrugating medium are crushed and bonded into solid fiber board, said blank having its opposite crushed end edges overlapped to form a joint, and having scores to define the front, back and side panels and end closure panels, of a rectangular sectioned tube, said blank having at least one of its external surfaces coated to render the blank waterproof.

5. Corrugated fiber board as set forth in claim 4, wherein an area of the corrugated board, inward of the crushed edge thereof is crushed and the layers bonded, and the crushed area provided with an aperture the entire marginal edge of which is disposed in the solid fiber board formed by the crushing and bonding of said area.

6. A corrugated fiber board container blank for forming a container for liquids comprised of a single blank formed of a rectangular unslotted section of corrugated fiber board having liners and a corrugating medium disposed therebetween, said section having an uninterrupted continuous crushed perimetral marginal edge area, in which the liners and corrugating medium are crushed and bonded into solid fiber board, of a thickness substantially less than a half of the thickness of the uncrushed areas of said corrugated fiber board, and the exterior surfaces of said liners being coated to render the surfaces waterproof, said blank having scores to define front, back and side panels and end closure panels, and being folded on at least two of said scores and having its opposite crushed end edge areas overlapped and bonded along the entire length of the overlap, whereby to form a flat folded container blank ready for erection into a rectangular sectioned tubular form.

7. A corrugated fiber board container blank for forming a container for liquids comprised of a single blank formed of a rectangular unslotted section of corrugated fiber board having liners and a corrugating medium disposed therebetween, said section having an uninterrupted continuous crushed perimetral marginal edge area, in which one liner and the corrugating medium are crushed upon the other liner, and the liners and medium as thus crushed are bonded into solid fiber board, of a thickness substantially less than a half of the thickness of the uncrushed areas of said corrugated fiber board, and the exterior surface of said one liner being coated with hot melt adhesive-coating, said blank having scores to define front, back and side panels and end closure panels, and being folded on at least two of said scores and having its opposite crushed end edge areas overlapped and bonded along the entire length of the overlap, whereby to form a flat folded container blank ready for erection into a rectangular sectioned tubular form.

8. A corrugated fiber board container blank for forming a container for liquids comprised of a single blank formed of a rectangular unslotted section of corrugated fiber board having liners and a corrugating medium disposed therebetween, said section having an uninterrupted continuous crushed perimetral marginal edge area in which along one end edge and the adjacent side edges one liner and the corrugating medium are crushed upon the other liner, and the liners and medium as thus crushed are bonded into solid fiber board of a thickness substantially less than a half of the thickness of the uncrushed areas of said corrugated fiber board, and in which one surface of the solid fiber board lies in a plane with the exterior surface of said one liner, and in which along the other end edge area the liners and the corrugating medium are crushed together and bonded into solid fiber board, with the surface planes lying within the planes of the surfaces of the uncrushed areas, and the exterior surface of said one liner being coated with hot melt adhesive-coating, said blank having scores to define front, back and side panels and end closure panels, and being folded substantially in the plane of said one liner on at least two of said scores and having its crushed end edge area overlapped and bonded to the exterior surface of the one liner of the other end edge area along the entire length of the overlap, whereby to form a flat folded container blank ready for erection into a rectangular sectioned tubular form.

9. A corrugated fiber board container blank for forming a container for liquids comprised of a single blank formed of a rectangular unslotted section of corrugated fiber board having liners and a corrugating medium disposed therebetween, said section having an uninterrupted continuous crushed perimetral marginal edge area in which along one end edge and the adjacent side edges one liner and the corrugating medium are crushed upon the other liner, and the liners and medium as thus crushed are bonded into solid fiber-board of a thickness substantially less than a half of the thickness of the uncrushed areas of said corrugated fiber board, and in which one surface of the solid fiber board lies in a plane with the exterior surface of said other liner, and in which along the other end edge area the liners and the corrugating medium are crushed together and bonded into solid fiber board with the surface planes lying within the planes of the surfaces of the uncrushed areas, said blank having scores to define the front, back and side panels and end closure panels, and being folded double substantially in the plane of said one liner on at least two of said scores and having its crushed end edge area overlapped and bonded to the exterior surface of the one liner of the other end edge along the entire length of the overlap, whereby to form a flat folded container blank ready for erection into a rectangular sectioned tubular form.

10. An end closure for a self-sustaining tubular container formed from a rectangular section of corrugated fiber board comprising spaced liners and a corrugating medium, the peripheral edge area of which has been crushed and bonded into solid fiber board, said container having a body portion defined by four substantially rectangular side walls, said end closure comprising a pair of end rectangular panels extending from a first pair of oppositely disposed side walls and projecting substantially in the same plane in opposite directions across and of a width to extend to the center of the end of said container body portion, and rectangular panels of crushed and bonded solid fiber board extending from the second pair of oppositely disposed side walls of the same width as said first named panels, and hingedly connected along scores to the adjacent first named panels, said last named panels being diagonally scored and having triangular corner portions folded over the remainder thereof, a continuous lip extension of crushed and bonded solid fiber board formed along the edge of each of said panels, said lip extension of crushed and bonded solid fiber board formed along the edge of each of said panels, said lip extensions being sealed together to form a fin, and said fin being folded to overlie a portion of one of said first named pnaels and portions of a triangular portion of each of said second named pair of panels, and said second named panels being folded down and overlying the upper ends of the carton sides from which the panels extend, the area of the first named panel covered by the folded over fin, and the areas of the side walls beneath said second named panels being also crushed and bonded into solid fiber board to form nesting recesses to receive the fin and second named pair of panels.

11. A container having an end closure as set forth in claim 10, wherein an area of the corrugated area of one of said first named panels is crushed and the layers bonded, and the crushed area provided with an aperture, the entire marginal edge of which is disposed in the solid fiber board formed by the crushing and bonding.

12. An end closure for a self-sustaining tubular container formed from a rectangular section of corrugated fiber board comprising spaced liners and a corrugating medium, the peripheral edge area of which has been crushed and bonded into solid fiber board and said section having its outer surfaces coated with a plastic adhesive coating, said container having a body portion defined by four substantially rectangular side walls, said end closure comprising a pair of end rectangular panels extending from a first pair of oppositely disposed side walls and projecting substantially in the same plane in opposite directions across and of a width to extend to the center of the end of said container body portion, and rectangular panels of crushed and bonded solid fiber board extending from the second pair of oppositely disposed side walls of the same width as said first named panels, and hingedly connected along scores to the adjacent first named panels, said last named panels being diagonally scored and having, triangular corner portions folded over the remainder thereof and heat sealed thereto, a continuous lip extension of crushed and bonded solid fiber board formed along the edge of each of said panels, said lip extensions being heat sealed together to form a fin, and said fin being folded to overlie a portion of one of said first named panels and portions of a triangular portion of each of said second named pair of panels, and said second named panels being folded down and overlying the upper ends of the carton sides from which the panels extend, the area of the first named panel covered by the folded over fin, and the areas of the side walls beneath said second named panels being also crushed and bonded into solid fiber board to form nesting recesses to receive the fin and second named pair of panels.

13. A container having an end closure as set forth in claim 12, wherein one of the second named panels is provided with at least one finger aperture for carrying.

14. A container having an end closure as set forth in claim 10, wherein the crushed area of the body portion sidewall beneath one of the second named panels is substantially of triangle configuration with the base of the triangle lying substantially in the plane of the container end, and in which the said area is scored along the median and legs of said triangle to facilitate the formation of a pour spout by the spreading of the triangular corner portions from the remainder of the panel, and the spreading of the lips forming said fin adjacent the corner portions.

15. A container according to claim 14 wherein the other of the second named panels is provided with at least one finger aperture to facilitate handling.

References Cited

UNITED STATES PATENTS

| 916,544 | 3/1909 | Ferres | 229—37 |
|---|---|---|---|
| 1,592,824 | 7/1926 | Fairchild. | |
| 1,698,908 | 1/1929 | Cleveland. | |
| 2,099,936 | 11/1937 | Kieckhefer | 93—36 |
| 2,276,363 | 3/1942 | Zalkind. | |
| 2,710,134 | 6/1955 | Schroeder et al. | 229—37 |
| 2,732,995 | 1/1956 | Geisler et al. | 229—33 |
| 2,949,151 | 8/1960 | Goldstein. | |

JOSEPH R. LECLAIR, *Primary Examiner.*

GEORGE O. RALSTON, *Examiner.*

D. F. NORTON, *Assistant Examiner.*